April 4, 1950  C. A. COBB  2,502,556
TEMPERATURE CONTROL DEVICE
Filed Aug. 18, 1947  3 Sheets-Sheet 1
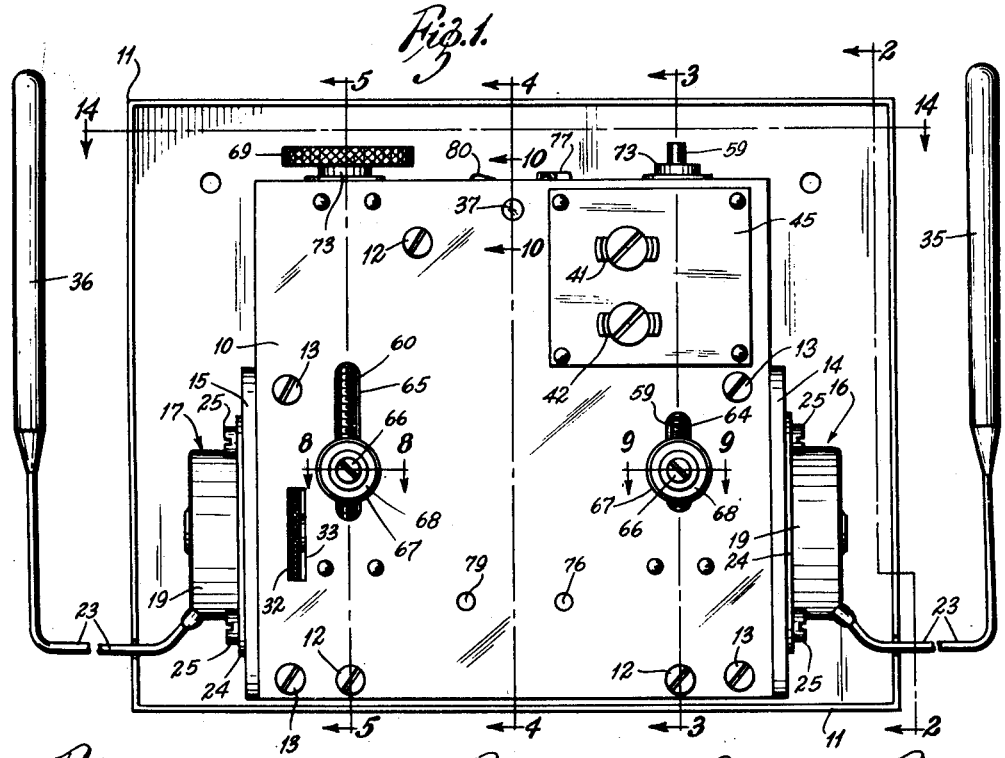
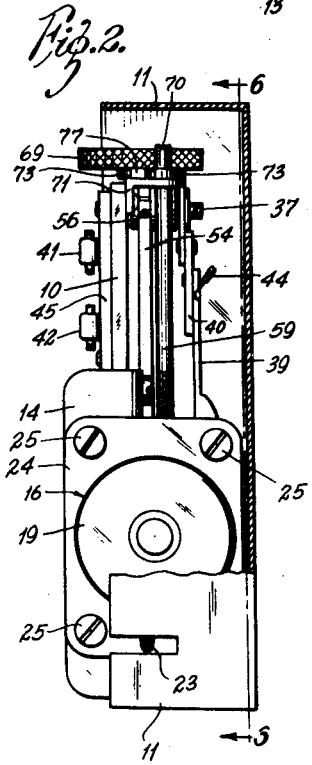
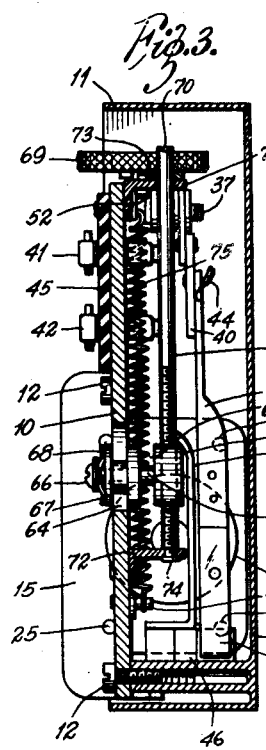
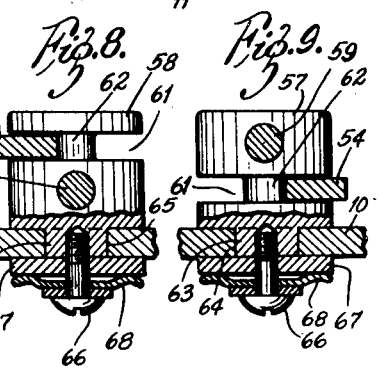
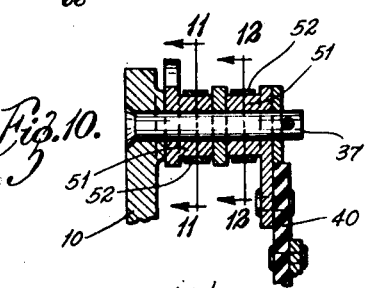
INVENTOR:
CLIFTON A. COBB,
BY Charles E. Markham
AGENT.

April 4, 1950 C. A. COBB 2,502,556
TEMPERATURE CONTROL DEVICE
Filed Aug. 18, 1947 3 Sheets-Sheet 2
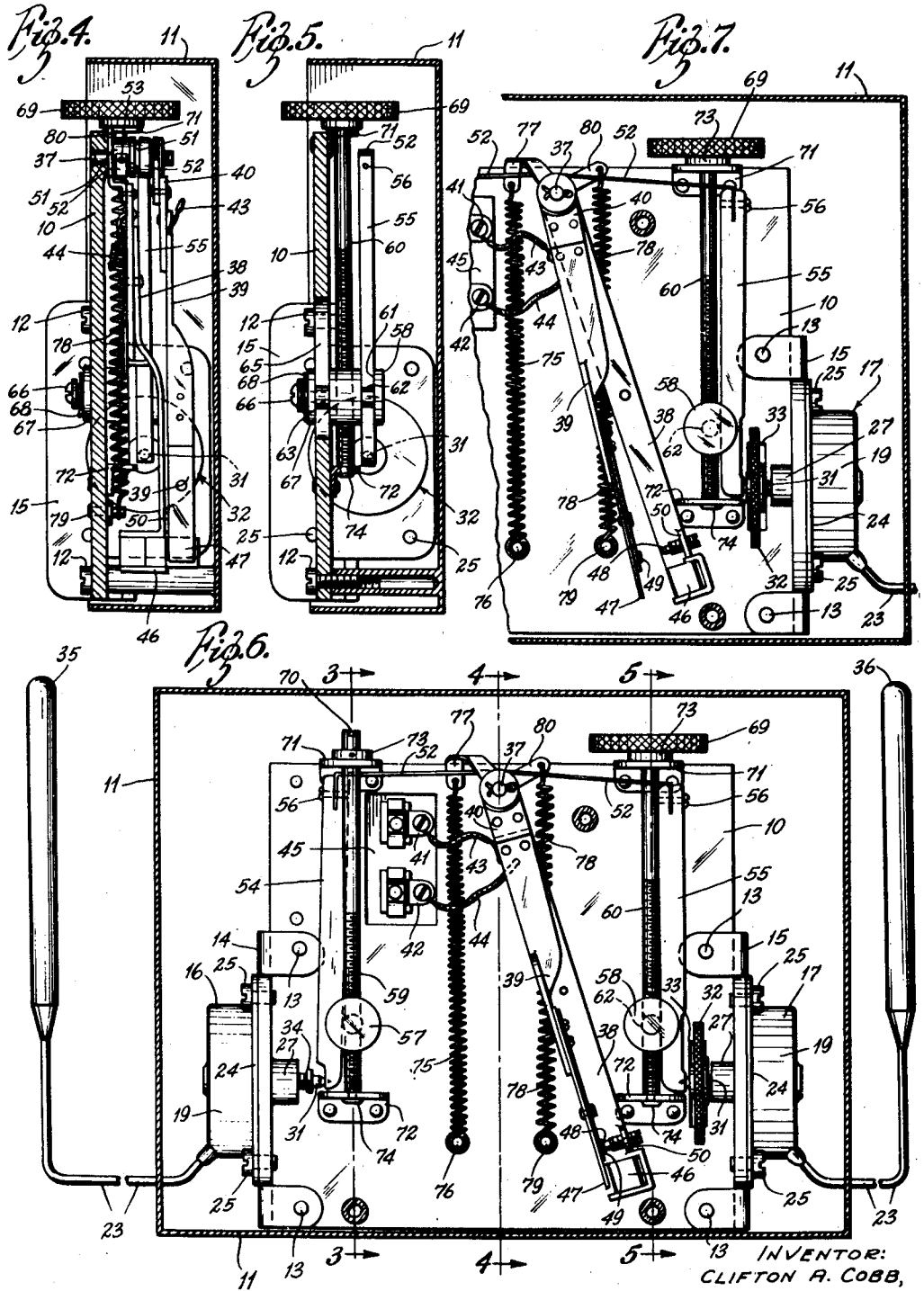
INVENTOR:
CLIFTON A. COBB,
By Charles E. Markham
AGENT.

April 4, 1950          C. A. COBB          2,502,556
TEMPERATURE CONTROL DEVICE
Filed Aug. 18, 1947          3 Sheets-Sheet 3
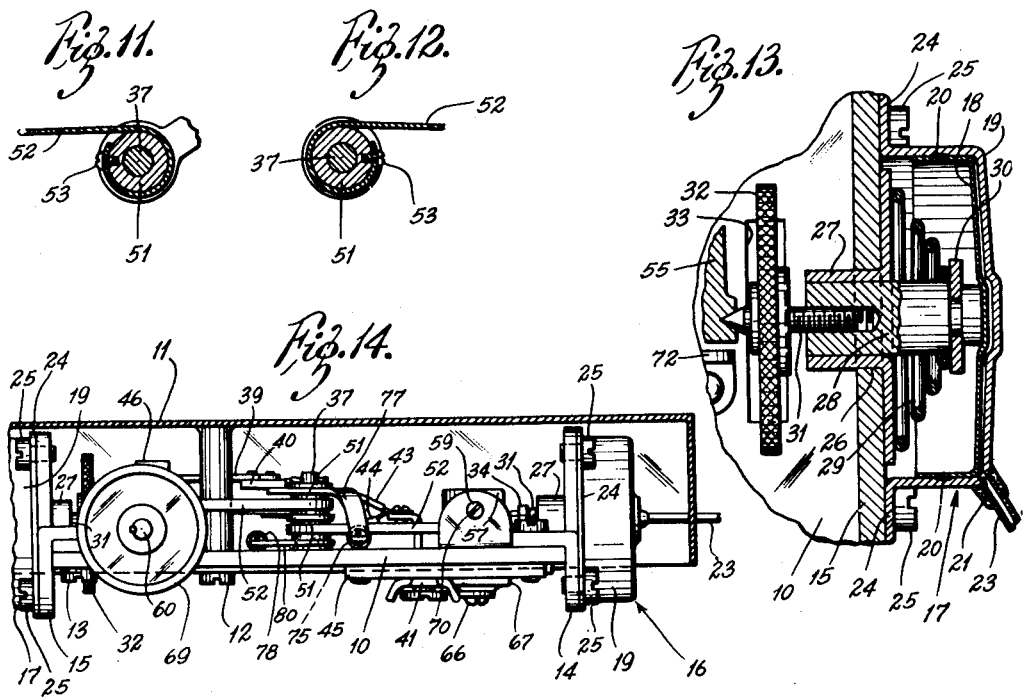
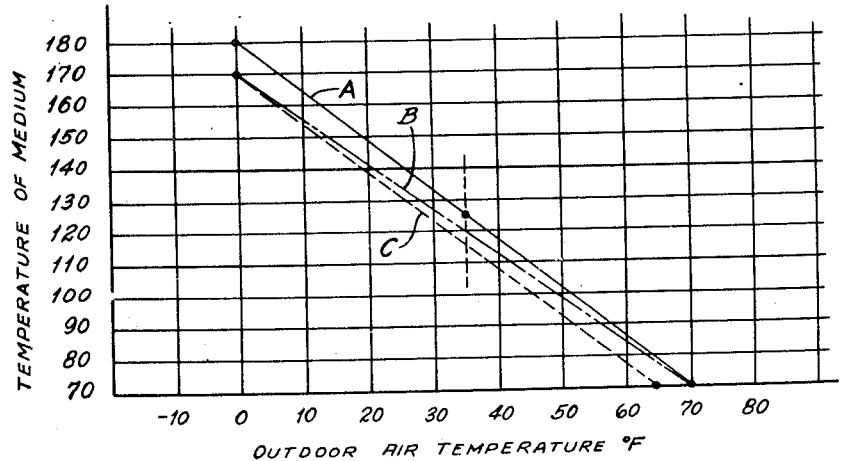
INVENTOR:
CLIFTON A. COBB,
BY Charles E. Markham
AGENT.

Patented Apr. 4, 1950

2,502,556

UNITED STATES PATENT OFFICE 2,502,556

TEMPERATURE CONTROL DEVICE

Clifton A. Cobb, University City, Mo., assignor to Missouri Automatic Control Corporation, St. Louis, Mo., a corporation of Missouri Application August 18, 1947, Serial No. 769,196

8 Claims. (Cl. 200—81.5)

This invention relates generally to temperature control devices, and more particularly to control devices capable of controlling the amount of heat supplied to or removed from a body so as to vary its temperature in predetermined relationship with the varying temperature of another body. This type of temperature control is usually employed in space conditioning systems to vary the temperature of the heating or cooling medium in predetermined relationship with variations in the outdoor air temperature. They are commonly referred to in the control manufacturing industry as "indoor-outdoor" controllers.

Prior constructions of this type of controller have usually included a pair of temperature responsive elements, switching mechanism for starting and stopping the heat change producer, and a motion transmission lever. One of the elements being responsive to outdoor air temperature, the other element being responsive to the temperature of the medium, and the lever being arranged so as to transmit the algebraic sum of the expanding and contracting movements of the elements to the switching mechanism for the operation thereof. Because heat transfer rates, through the walls of the space to be conditioned may vary, and because characteristics of medium circulating systems and heat exchange devices may vary, as between installations or uses of the controller, it is found necessary to incorporate, in these control devices, means whereby the controlled relationship of the medium temperature to outdoor air temperature may be selectively varied throughout the range of outdoor air temperatures.

The present invention has for an object, the provision of a generally new and improved control device of the above character, which is positive in its action and in which greater sensitivity is obtained by substantial multiplication of the movements of both expansible elements.

It is a further object of the present invention to provide a device of the above character in which independent means for multiplication of the movement of each expansible element is provided, and in which the ratio of change in temperature of the medium to change in temperature of the outdoor air is varied by varying the ratio of multiplication of the movements of the two elements.

It is a further object to provide a device of the above character in which multiplication of the movements of the two expansible elements may be varied independently.

Another object of the present invention is the provision of a device of the above character in which an operating differential for the switching mechanism is provided, which differential may be varied independently and without affecting lever multiplication factors or being affected by changes in lever multiplication factors.

Another object is the provision of a device of the above character in which the expansible elements are filled with a thermally sensitive liquid, which remains in a liquid state throughout the range of operating temperatures whereby the movements of the elements in response to temperature change are positive.

Other objects and advantages will become apparent from the following detailed description of a preferred embodiment of the present invention, when considered in connection with the accompanying drawings.

In the drawings,

Figure 1 is a front view of a temperature controller constructed in accordance with the present invention;

Figure 2 is a side view taken on line 2—2 of Figure 1;

Figures 3, 4, and 5 are vertical cross-sectional views taken on lines 3—3, 4—4, and 5—5 of Figures 1 and 6;

Figure 6 is a rear view of the controller, the rear cover plate of the casing being removed, and is taken on line 6—6 of Figure 2;

Figure 7 is also a rear view (in part) showing parts of the controller in a different operation position;

Figure 8 is an enlarged sectional view showing one of the adjustable pivots and is taken on line 8—8 of Figure 1;

Figure 9 is an enlarged sectional view showing the other adjustable pivot and is taken on line 9—9 of Figure 1;

Figure 10 is an enlarged sectional view showing the switch arm pivot and is taken on line 10—10 of Figure 1;

Figures 11 and 12 are cross-sectional views of the switch arm pivot and are taken on lines 11—11 and 12—12 of Figure 10;

Figure 13 is an enlarged sectional view of one of the expansible elements.

Figure 14 is a top view of the controller taken on line 14—14 of Figure 1;

Figure 15 is a diagram showing how the temperature of the condition changing medium is controlled in relation to the outdoor air temperature and the effect of adjustments embodied in the controller.

Referring more particularly to the drawings, reference numeral 10 indicates a mounting plate which is attached to a casing 11 by screws 12. Rigidly attached to opposite ends of the mounting plate by screws 13 are mounting brackets 14 and 15 on which are mounted expansible elements 16 and 17. These elements are alike in construction and operation and each comprises an inner flexible cup member 18 and an outer rigid cup member 19 (see Figure 13) which are joined by the continuous welding together of their side walls as indicated at 20.

There is a perforation 21 in the edge of the outer cup 19 at which point a capillary tube 23 is attached, as by brazing. The capillary therefore communicates with the space between the cups. Cup member 19 is further provided with a flange 24 through which screws 25 pass for attachment of the elements to the mounting brackets. Construction details of these elements, which are adapted to operate with a thermosensitive liquid, are fully shown and described in U. S. Patent No. 2,203,841 to L. M. Persons, issued June 11, 1940.

Mounting brackets 14 and 15 have perforations 26 which are concentric with the elements and in which are fitted bushings 27. Slidably fitted in the bushings are follower pins 28. The follower pins are urged against the walls of the flexible cups by diaphragm return springs 29 which bear against the mounting brackets on one end and at their other ends against C washers 30 which are mounted on the pins. The outer ends of the follower pins receive in threaded engagement, adjustment studs 31 which have pointed outer ends. The stud in element 17 is provided with a large knurled wheel 32 which partially projects through a slot 33 in the mounting plate 10 so as to be accessible from the front of the control for convenient adjustment. The stud in element 16 on the other hand is provided with a small hexagon portion 34 adapted to be adjusted by a tool and is not accessible from the front of the casing.

Connected to expansible elements 16 and 17, by the capillary tubes, are bulbs 35 and 36 respectively. Each sealed system consisting of an expansible element, capillary and bulb is exhausted of air and then filled with a temperature sensitive liquid which remains in the liquid state throughout the range of operating temperatures. Bulb 35 is located so as to be sensitive to the basic varying temperature, which in the case of a space heating or cooling system would be the outside air temperature, and bulb 36 would be located in the heating or cooling medium.

Centrally pivoted on mounting plate 10 and near its upper edge on a pivot 37 are a pair of switch arms 38 and 39. The outer ends of the switch arms are electrically insulated from the inner pivoted portions by the interposed sections of insulating material 40 (see Figure 10). The outer ends of the switch arms are also electrically connected to the terminal posts 41 and 42 by pigtails 43 and 44. Terminals 41 and 42 are mounted on an insulating panel 45 which in turn is mounted on the mounting plate 10.

Switch arm 38 carries a permanent magnet 46 at its outer end and an armature 47 in the form of a strip of magnetic material is attached to the outer end of arm 39. Arms 38 and 39 also carry at their outer ends contacts 48 and 49 respectively. Contact 48 has a threaded portion which engages a threaded lug 50 on arm 38. It will be seen that by this threaded adjustment of contact 48, the closed position gap between the armature and magnet may be varied.

Switch arms 38 and 39 are further provided with hub portions 51 at their inner pivoted ends (see Figures 10, 11, and 12). Laid around the hub portions in approximately a full single wrap, are a pair of metal ribbon connectors 52. These ribbons are attached at one end to the hubs by screws 53. The other ends of the ribbons are connected to the upper ends of a pair of motion multiplication levers 54 and 55 by screws 56. The lower ends of levers 54 and 55 are engaged in point contact by the adjustable pointed studs 31 and they are arranged to pivot intermediately on the adjustable pivots 57 and 58 respectively.

These pivots are adjusted vertically by threaded adjusting screws 59 and 60, which pass transversely through the pivots and are in threaded engagement therewith. The pivots are provided with guide grooves 61 into which freely enter the multiplying levers 54 and 55 to pivot on the small diameter portions 62 (see Figures 8 and 9). The pivots are further provided with reduced portions 63 slightly less in length than the thickness of mounting plate 10. These portions enter slots 64 and 65 in the mounting plate (see Figure 1). Screws 66 and rigid washers 67 provide a means for clamping or locking the pivots in an adjusted position. The screws may also be provided with spring lock washers 68.

Adjusting screw 60 has a knurled wheel 69 attached to its upper end to provide for convenient adjustment, while adjustment screw 59 on the other hand is provided only with a screw driver slot 70 and is not accessible for convenient field adjustment. The adjustment screws are supported on upper brackets 71 and lower brackets 72 attached to the mounting plate, and their longitudinal movement is restrained by upper collars 73 and lower upset heads 74 on the screws which bear against the horizontal legs of the brackets.

A lever system return spring 75, anchored at its lower end on the mounting plate at 76 and having its upper end connected to a lug 77 on the inner end of switch arm 39, normally urges this arm in a counter-clockwise direction toward the switch arm 38. The multiplying lever 55, which is connected to switch arm 39 by a ribbon 52, is consequently held constantly against the pivoted stud 31 of the expansible element 17 and the pivot 58. Likewise switch arm 38 is normally urged in a clockwise direction toward switch arm 39 by the return spring 78, which has its lower end anchored to the mounting plate at 79 and its upper end connected to a lug 80 on the inner end of switch arm 38. The multiplying lever 54 therefore being held constantly against the pointed stud 31 of element 16 and the adjustable pivot 57.

Operation

Assuming the present use of the controller to be that of varying the temperature of the heating medium in a space heating system in a desired relationship with variations in the outdoor air temperature; and that an energizing circuit for the operation of a heat producer is completed upon the closing of contacts 48 and 49. In this use, the sensitive bulb 36 is so disposed that element 17 will respond to variations in the temperature of the heating medium and sensitive bulb 35 is so disposed that element 16 will respond to variations in outdoor air temperature.

An increase in temperature of the outdoor air will result in an expansion of element 16, the counter-clockwise rotation of lever 54 about pivot 57 and a counter-clockwise rotation of switch arm 38 away from switch 39, which will separate contacts 48 and 49. Likewise arm 39 will be rotated away from arm 38 in a clockwise direction upon an increase in the temperature of the heating medium. Switch arm 38 will therefore be positioned in accordance with the temperature of the outdoor air and arm 39 will alternately approach and move away from it to start and stop production of heat as the temperature of the medium falls below or rises above that which has been preselected as corresponding with the outdoor temperature which has so positioned arm 38.

It will be seen from the foregoing that if the outdoor temperature increases, moving the outer end of arm 38 and contact 48 toward the right, in Figures 6 and 7, it will require a greater decrease in the temperature of the medium to permit arm 39 to follow and close the contacts to start heat production. Also the contacts will break at a new lower temperature of the medium. The controlled temperature of the medium therefore varies inversely with the outdoor air temperature as depicted in the diagram, Figure 15. Also because the multiplication of the movement of elements 16 and 17 is constant and because the coefficient of expansion of the thermo-sensitive liquid is constant within the range of operation, the ratios of the temperature of the heating medium to the outdoor air temperature will vary in a straight line as shown.

Adjusting means

Means for adjusting the pivot 57 and the adjusting stud 31 in the element 16 are provided primarily for factory adjustment. They are, therefore, not arranged for convenient field adjustment and may be sealed in some suitable manner in factory adjusted positions if desired. The position of the pivot 57 will obviously determine the amount of movement of arm 38 per degree temperature change in the basic varying temperature. As between uses of the control, the basic varying temperature range may vary substantially and the pivot 57 is preferably adjusted at the factory in anticipation of a particular use so that the total swing of the arm 38 for the full temperature range of this use will not be too excessive to accommodate, but will be sufficient to obtain the desired sensitivity. By adjustment of stud 31 in element 16 the center of the arc swung by lever 38 for a particular temperature range, may be located with respect to other parts of the control as desired.

Having established the travel of arm 38 for the range of outdoor temperature or basic varying temperature, the instrument may be adjusted to maintain a selected temperature of the medium for a given outdoor air temperature by adjusting the pointed stud 31 of element 17 outward until the contacts 47 and 48 just break. Bulbs 35 and 36, of course, being immersed in baths of the desired corresponding temperatures.

The rate at which this selected ratio will change as the outdoor air temperature varies may be varied by the adjustment of the pivot 58 which is accomplished by turning the knurled wheel 69. Assuming that a rate of change in the temperature ratios has been selected as indicated by the full line A in Fig. 15, and it is subsequently determined that a slightly lower temperature of the medium is correct for the lower outdoor air temperatures. The slope of the ratio change line may be altered to that indicated by the dot-dash line B by adjusting pivot 58 downwardly. This downward adjustment of pivot 58 will change the ratio of the multiplication factors of the levers and cause the contacts to open at relatively lower medium temperatures as the arm 39 moves leftward with decreasing outdoor air temperatures. If it is determined that the slope of the ratio change line is correct but that the temperature of the medium is too high throughout the range, the temperature of the medium may be proportionately lowered throughout the range as indicated by the dotted line C by adjusting pointed stud 31 of element 17 outwardly.

It may be desirable to compute a scale which may be disposed adjacent pivot 58 and whereon the rates for different positions of the pivot may be indicated in any suitable terms.

Differential

The permanent magnet 46 on switch arm 38 and the armature 47 on switch arm 39 provide a snap action in the closing and opening movements of contacts 48 and 49. It is also apparent that a differential in temperature is required to open and close the contacts because of this magnet and armature. This differential may be varied by adjusting the contact 48 which is provided with threaded adjusting means and which when adjusted outwardly toward contact 49 increases the closed position gap between the armature and magnet thus decreasing the required operating temperature differential.

The foregoing description is intended to be illustrative and not limiting and the exclusive use of all modifications of the present invention within the scope of the appended claims is contemplated.

I claim:

1. In a temperature control device of the class described, switching means including a pair of movable contacts, a pair of temperature responsive elements, separate motion multiplication and transmission means for transmitting independently the movement of each element in response to temperature changes to one of said contacts each of which means includes a lever having an intermediate pivot, and means for varying in infinite increments the position of said pivots with respect to the ends of said levers thereby to independently and infinitely vary the multiplication of the movements of either temperature responsive element.

2. In a temperature control device of the class described, a first lever, a temperature responsive element for moving said lever in one direction upon an increase in temperature, a second lever, a temperature responsive element for moving said second lever in an opposite direction upon an increase in temperature, switching means operable by the movements of said levers relative to each other, and means interposed between said elements and said levers for independently varying the multiplication of the movements.

3. In a temperature control device of the class described, a first lever, a temperature responsive element for moving said lever in one direction upon an increase in temperature, a second lever, a temperature responsive element for moving said second lever in an opposite direction upon an increase in temperature, switching means operable by the movements of said levers relative to each other, independently variable motion multiplying and transmission means interposed between said elements and said levers and means associated with each of said temperature responsive elements for independently adjusting the position of each lever with respect to its actuating element.

4. In a temperature control device in combination, a first lever having an intermediate pivot, a temperature responsive element operatively connected to one end of said lever for moving said lever in one direction upon an increase in temperature, a second lever having an intermediate pivot, a temperature responsive element operatively connected to one end of said second lever for moving it in an opposite direction upon an increase in temperature, switching means operatively connected to the other ends of said levers and being operable by movements of said levers relative to each other, means for adjusting said pivots relative to the ends of said levers, and means for adjusting the position of at least one of said levers for respect to its actuating element.

5. In a temperature control device in combination, a first pair of levers having a common pivot, switching means operable by movements of said levers relative to each other, a pair of temperature responsive elements, a second pair of levers, said second levers being operatively connected at one end to said temperature responsive elements and being connected at their other ends to said first levers, intermediate pivot means for each of said second levers, and means for independently adjusting said pivots relative to the ends of the levers.

6. In a control device of the class described, a first pair of levers having a common pivot, switching means operable by the relative movements of said levers, a pair of condition responsive elements, a second pair of levers, said second levers each having an operative connection at one end with one of said condition responsive elements and being connected at its other end to one of said first levers, intermediate pivot means for each of said second levers, means for independently adjusting said intermediate pivots relative to the ends of said levers, and means for inpendently adjusting the operative connections between said second levers and said condition responsive elements.

7. In a control device of the class described, a pair of levers having a common pivot, switching means operable by the relative movements of said levers, a pair of condition responsive elements, and independent variable motion multiplying and transmission means interposed between said levers and said condition responsive elements.

8. In a control device of the class described, a pair of temperature responsive elements of the incompressible type in which movement in response to temperature change is relatively small but positive, a first pair of motion multiplying levers each being operatively connected at one end with one of said elements, an intermediate adjustable pivot for each of said levers, a second pair of motion multiplying levers commonly pivoted at one end and arranged substantially parallel to said first levers, said second levers having hub portions at their pivoted ends, said first levers being connected at their other ends to said second levers by flexible metal ribbons arranged to wrap around the hub portions of said second levers, and switching means including a contact member carried by each of the free ends of said second levers.

CLIFTON A. COBB.

REFERENCES CITED

The following references are of record in the file of this patent:

UNITED STATES PATENTS

| Number | Name | Date |
|---|---|---|
| 1,146,637 | Massa | July 13, 1915 |
| 2,025,097 | Doughtery | Dec. 24, 1935 |
| 2,063,613 | McCarthy | Dec. 8, 1936 |
| 2,175,085 | Lothrop | Oct. 3, 1939 |
| 2,260,014 | Ettinger | Oct. 21, 1941 |
| 2,297,705 | Jehle | Oct. 6, 1942 |

FOREIGN PATENTS

| Number | Country | Date |
|---|---|---|
| 318,699 | Great Britain | Sept. 12, 1929 |